US006768453B2

(12) United States Patent
Solbach

(10) Patent No.: US 6,768,453 B2
(45) Date of Patent: Jul. 27, 2004

(54) ARRAY ANTENNA SYSTEM

(75) Inventor: Klaus Solbach, Muelheim (DE)

(73) Assignee: Eads Deutschland GmbH, Munich (DE)

( * ) Notice: Subject to any disclaimer, the term of this patent is extended or adjusted under 35 U.S.C. 154(b) by 26 days.

(21) Appl. No.: 10/046,551

(22) Filed: Jan. 16, 2002

(65) Prior Publication Data

US 2002/0109638 A1 Aug. 15, 2002

(30) Foreign Application Priority Data

Jan. 16, 2001 (DE) ........................................ 101 01 666

(51) Int. Cl.[7] ................................................ H04B 7/00

(52) U.S. Cl. ...................................... 342/367; 342/368

(58) Field of Search ................................ 342/367, 368, 342/372; 343/767, 770, 771, 753, 754, 785, 909, 911 R, 872, 873

(56) References Cited

U.S. PATENT DOCUMENTS 5,877,660 A 3/1999 Ebine et al.
6,246,369 B1 * 6/2001 Brown et al. ........ 343/700 MS

FOREIGN PATENT DOCUMENTS

| | | |
|---|---|---|
| DE | 1024587 | 5/1956 |
| DE | 957239 | 1/1957 |
| DE | 1020692 | 3/1957 |
| DE | 1105486 | 8/1958 |
| DE | 3627597 | 2/1988 |
| EP | 0310661 B1 | 6/1994 |
| EP | 0615659 B1 | 7/1998 |

* cited by examiner

*Primary Examiner*—Theodore M. Blum
(74) *Attorney, Agent, or Firm*—Crowell & Moring LLP

(57) ABSTRACT

An array antenna system with an electrically large array antenna comprises first and second antenna subarrays and, a combination transmission line network, which has an input for receiving an antenna line signal and outputs connected with the first and second antenna subarrays. The combination line network contains a phase shifting device for generating a phase displacement between output signals of the first output and of the second output before their feeding to the antenna subarrays; and devices are provided to compensate the phase displacement in the beam path of the antenna radiation emitted by the antenna subarrays.

18 Claims, 4 Drawing Sheets

ARRAY ANTENNA SYSTEM

BACKGROUND AND SUMMARY OF THE INVENTION

This application claims the priority of German patent document 101 01 666.2, filed Jan. 16, 2001, the disclosure of which is expressly incorporated by reference herein.

The invention relates to an array antenna system having an electrically large array antenna.

Array antenna systems are known which have an electrically large array antenna comprising a first antenna subarray and a second antenna subarray. A combination transmission line network is provided, which has an input for receiving an antenna power signal as well as a first output connected to emit a first output signal to the first antenna subarray, and a second output connected to emit a second output signal to the second antenna subarray.

Such array antenna systems according to the prior art typically have antenna subarrays which are arranged side-by-side in the form of antenna halves in a plane. In-phase output signals are supplied to the two antenna halves by the outputs of the combination line network (formed by a power splitter) to generate a sum pattern of the antennas, or oppositely phased output signals are supplied to generate a difference pattern.

Electrically large array antennas, particularly those with standing waves on the feeder lines (resonance feeding system) or those with narrowband radiation elements (such as patch antennas) frequently have very narrow matching widths, with resonance-type dependence of the reflection factor as illustrated in FIG. 3.

Frequently, it is impossible to increase the matching bandwidth of such antennas, or it is possible only at considerable additional expenditures, for example, by means of complex feeding systems. Nevertheless, large bandwidths with a constantly low reflection factor are frequently demanded for example, to permit the operation of frequency division multiplex filters or a constant power yield of transmitter amplifiers without a circulator.

European Patent Documents EP 0 310 661 B1 and EP 0 615 659 B1 disclose array antenna systems which contain a number of spatially mutually separated radiation elements, to which signals are fed which are displaced with respect to one another by a given phase for generating a spatial deflection of the antenna beam.

One object of the invention is to provide an array antenna system of the above-mentioned type which, with respect to the bandwidth, has a low input reflection factor and thus a greater matching bandwidth.

This and other objects and advantages are achieved by the array antenna system according to the invention, which has an electrically large array antenna including a first antenna subarray and a second antenna subarray, and a combination transmission line network having an input for receiving an antenna power signal. A first output of the combination line network is connected to emit a first output signal to the first antenna subarray, and a second output is connected to emit a second output signal to the second antenna subarray. According to the invention, the combination line network contains a phase shifting device for generating a phase displacement between the output signals of the first output and of the second output before they are fed to the antenna subarrays; and features are provided to compensate the phase displacement in the course of the beam of the antenna radiation emitted by the antenna subarrays. The array antenna system according to the invention has a matching bandwidth which is significantly larger than a corresponding conventional array antenna system.

The array antenna preferably comprises two equally large antenna subarrays or it consists of several such pairs of equally large antenna subarrays.

In particular, the first antenna subarray forms a first half-antenna of the array antenna, and the second antenna subarray forms a second half-antenna of the array antenna.

According to a first preferred embodiment of the invention, the phase shifting device generates a phase displacement of 90°.

Preferably, the devices for compensating the phase displacement cause a displacement between the radiation emitted by the first and second antenna subarrays in the main beam direction, by one quarter of a wavelength in the sense of a compensation of the 90° phase displacement generated by the phase shifting device.

According to an aspect of the invention, the antenna subarrays are mutually displaced with respect to the main beam direction of the antenna.

In a preferred embodiment, the antenna subarrays are arranged perpendicular to the main beam direction of the antenna, and are mutually displaced by a quarter of a wavelength.

According to an alternative embodiment, the antenna subarrays are arranged diagonally to the main beam direction of the antenna, and the centers of the antenna subarrays are mutually displaced with respect to the main beam direction by a quarter of a wavelength.

According to a further development of the last-mentioned embodiment, the antenna subarrays are arranged in a common plane.

According to another aspect of the invention, the antenna subarrays are covered by dielectric layers of different dielectric constants which compensate the phase displacement of the radiation emitted by the antenna subarrays.

According to the preferred embodiment, the dielectric layers have such a thickness that they cause a displacement between the radiation emitted by the antenna subarrays by one quarter of a wavelength in the sense of a compensation of the 90° phase displacement generated by the phase shifting device.

According to a preferred embodiment, the antenna subarrays are arranged in a common plane.

According to another advantageous embodiment, a first dielectric layer is air, and that a second dielectric layer is a layered medium with a dielectric constant which is greater than the dielectric constant of air.

According to yet another aspect of the invention, waveguide paths with different cross-sectional dimensions are arranged on the antenna subarrays, with cross-sectional dimensions arranged in such a way as to compensate the radiation emitted by the antenna subarrays.

The waveguide paths preferably have a length which differs by a defined amount, so that a displacement is caused of the radiation emitted by the antenna subarrays by one quarter of a wavelength in the sense of a compensation of the 90° phase displacement generated by the phase shifting device.

According to another preferred embodiment, the antenna subarrays are arranged in a common plane.

In an advantageous further development, transition paths having a transition from a narrow cross-section to a wide cross-section are provided at the output of the waveguide paths.

Advantageously, the antenna subarrays are electrically large in the direction of the division.

According to still another embodiment of the invention, the antenna subarrays are small in the direction perpendicular to the division.

The reflection factors of the antenna subarrays are preferably identical.

According to still another preferred embodiment of the array antenna system according to the invention, the combination line network has a 4-port power splitter, which is preferably formed by a Wilkinson splitter, a 3-dB directional coupler or an E-H waveguide double-T junction.

Other objects, advantages and novel features of the present invention will become apparent from the following detailed description of the invention when considered in conjunction with the accompanying drawings.

DETAILED DESCRIPTION OF THE DRAWINGS

Figure 1:
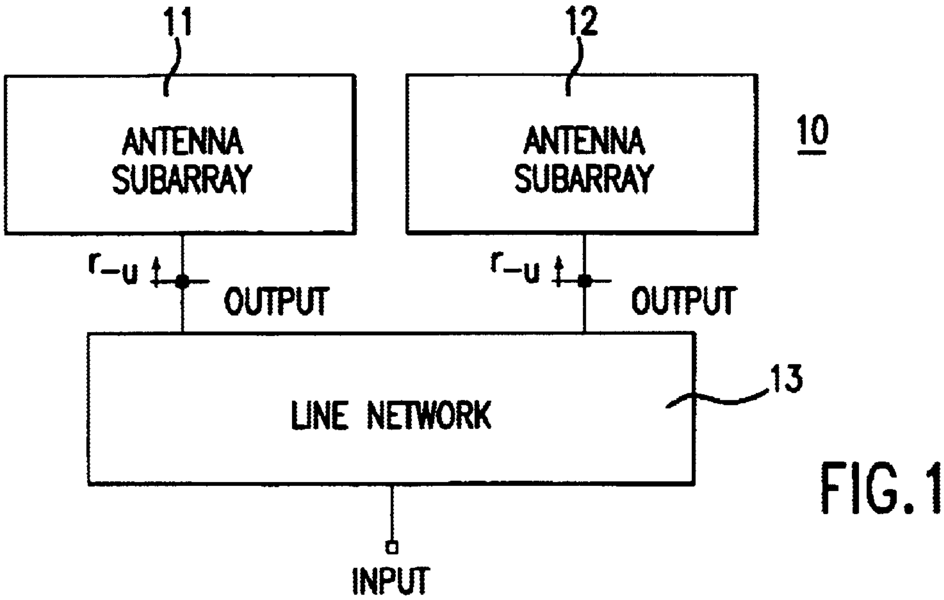
FIG. 1 is a schematic diagram which is a general view of an array antenna system with a first antenna subarray and a second antenna subarray and a combination transmission line network.

First, the general construction of an array antenna system, which is the object of the invention, will be discussed by means of FIG. 1. An electrically large array antenna, which as a whole has the reference number 10, comprises a first antenna subarray 11 and a second antenna subarray 12 which, in the illustrated embodiment, each form a first and a second half-antenna respectively of the array antenna 10 and have the same size. A combination transmission line network 13 comprises an input for receiving an antenna power signal, and a first output which is connected with the first antenna subarray 11 and emits a first output signal to the latter, as well as a second output which is connected with the second antenna subarray 12 and emits a second output signal to the latter.

Figure 2A:
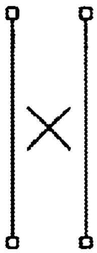
FIG. 2 is a view of various embodiments of 4-port power splitters, as can be used for a combination transmission line network of the array antenna system according to the invention.
Figure 2B:
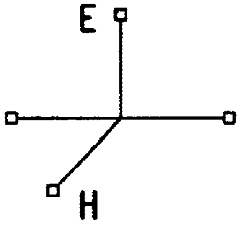
Figure 2C:
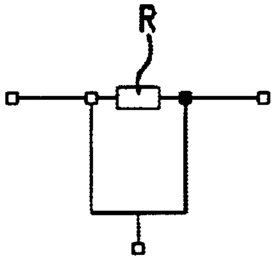

The combination transmission line network 13 may contain, for example, a 4-port power splitter which may be formed by a Wilkinson splitter, a 3-dB directional coupler or an E-H waveguide double-T junction, as illustrated by examples, in FIGS. 2*a*) to *c*).

Figure 3:
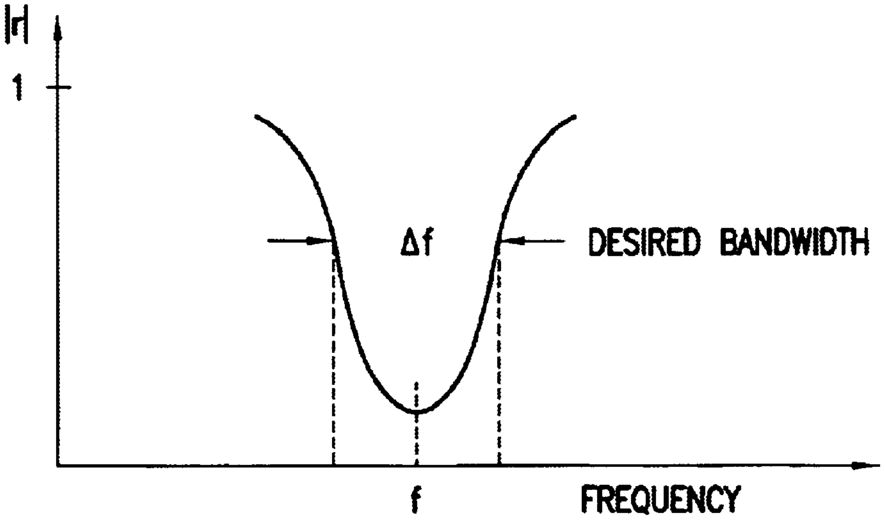
FIG. 3 is a diagram of the impedance match of an array antenna system as a function of the reflection factor depending on the frequency.

The input reflection factor ru of the antenna subarrays 11, 12, FIG. 1, now assumes a minimum around the nominal frequency f0, with a useful bandwidth Δf, as illustrated in FIG. 3. The useful bandwidth is a dimension figure for the matching bandwidth by which the array antenna can be operated.

Figure 4:
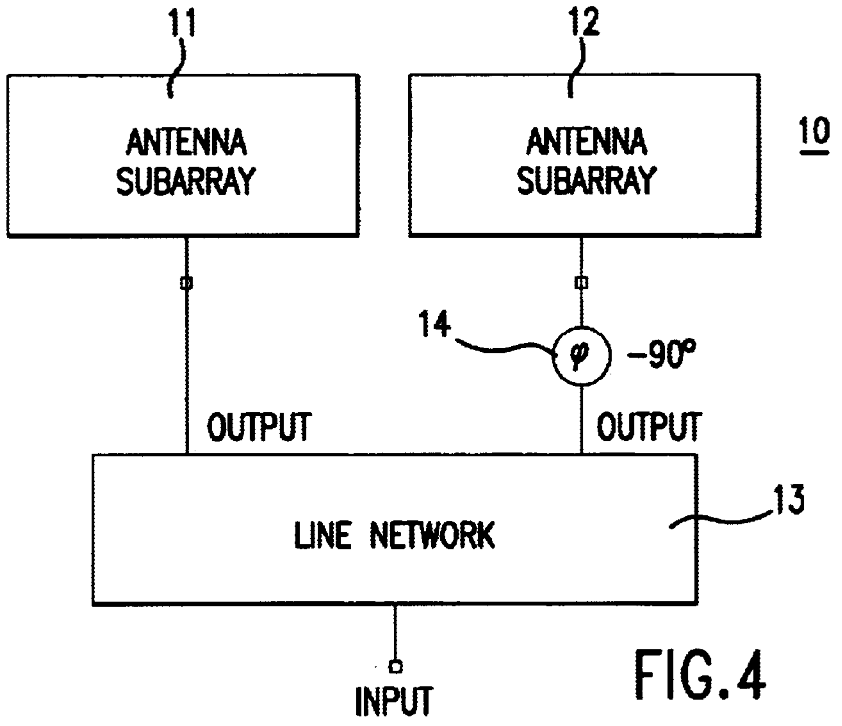
FIG. 4 is a schematic diagram of an array antenna system according to a first embodiment of the invention.

FIG. 4 illustrates schematically a first embodiment of the array antenna system according to the invention. The combination transmission line network 13 has a phase shifting device 14 which is connected between its output and one of the antenna subarrays 11, 12 forming the array antenna. In the embodiment illustrated in FIG. 4, the phase shifting device 14 is connected between the second output of the combination line network 13 and the second antenna subarray 12, and generates a phase displacement of the amount of 90° between the output signals of the first and second outputs of the combination line network 13 before they are fed to the antenna subarrays 11, 12 of the array antenna 10.

In general terms, devices are provided to again compensate the phase displacement generated in the combination line network 13 or the phase shifting device 14 provided therein, in the beam path of the antenna radiation emitted by the antenna subarrays 11, 12, so that the antenna radiation again uniformly has the phase position of the originally provided signal. For example, in the embodiments illustrated in FIGS. 5 and 6, the antenna subarrays 21, 22 and 31, 32 respectively of the subarray antennas 20 and 30 are mutually shifted in the main radiation direction of the antenna to compensate the above-mentioned phase displacement.

Figure 5A:
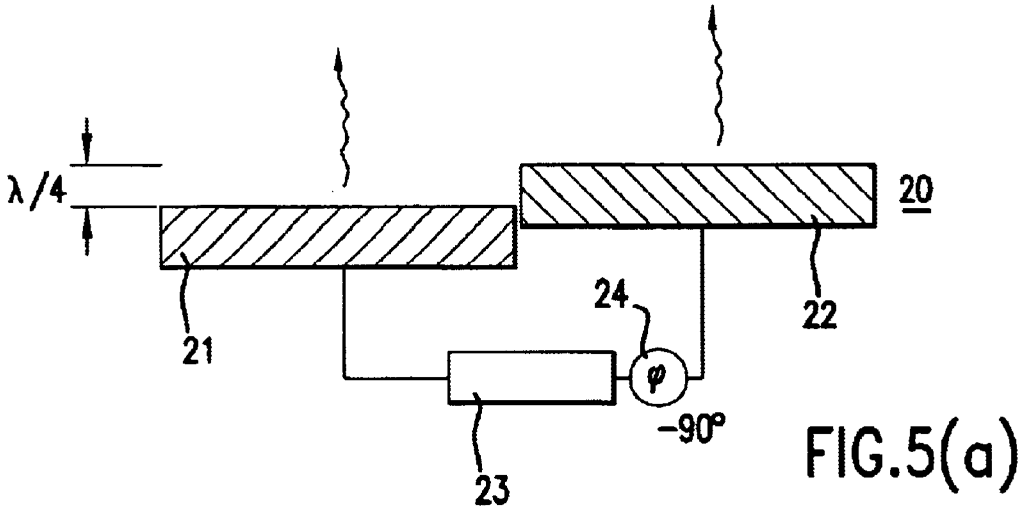
FIGS. 5*a*) and 5*b*) are schematic side and top views, respectively, of an array antenna system according to another embodiment of the invention.
Figure 5B:
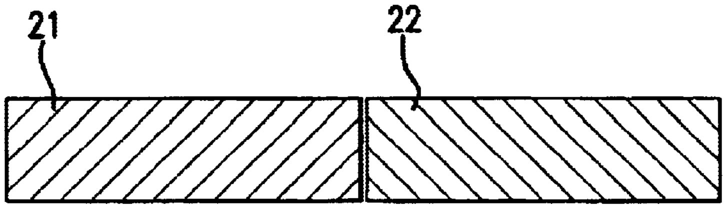

FIG. 5*a*) shows as a side view and FIG. 5*b*) shows as a top view, in which the antenna subarrays 21, 22 of the array antenna 20 are arranged perpendicular to the main radiation direction of the antenna and are mutually displaced by one quarter of a wavelength. The first antenna subarray 21 is connected directly with the first output of the combination line network 23, while the second antenna subarray 22 is connected by way of a phase shifting device 24 with the second output of the combination line network 23, so that the displacement of the two antenna subarrays 21, 22 by one quarter of a wavelength $\lambda/4$ with respect to one another compensates precisely the phase displacement by −90° caused by the phase shifting device 24.

Figure 6A:
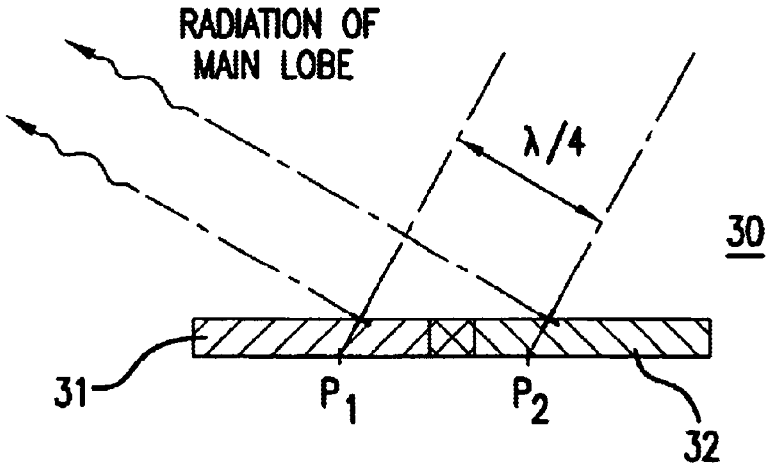
FIGS. 6*a*) and 6*b*) are schematic side and top views, respectively of another embodiment of an array antenna system according to the invention.
Figure 6B:
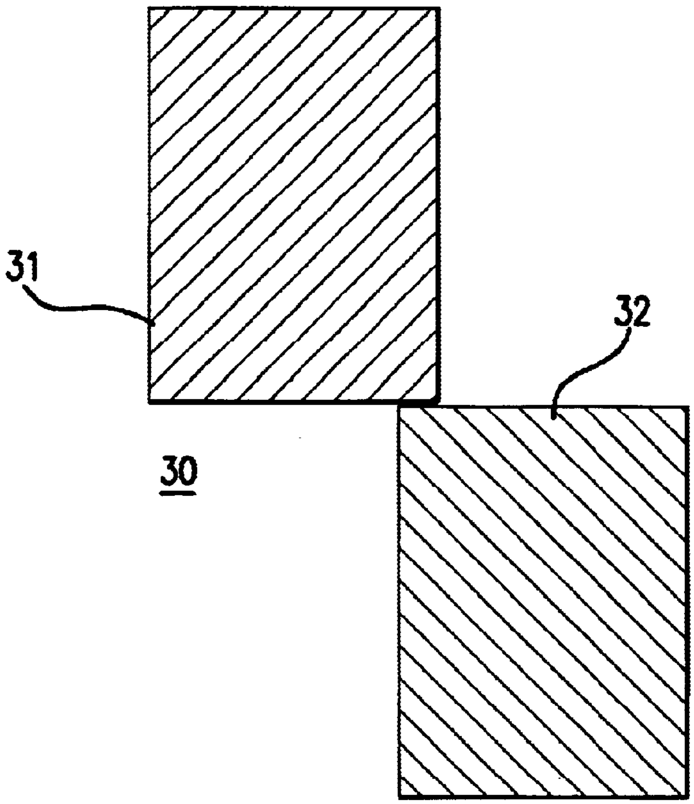

Similarly, FIG. 6*a*) is a side view and FIG. 6*b*) is a top view, in which the antenna subarrays 31, 32 of the array antenna 30 are arranged diagonally with respect to the main radiation direction of the antenna. The centers of the antenna subarrays 31, 32 which, in FIG. 6*a*) are indicated by P1 and P2 respectively, are mutually displaced with respect to the main radiation direction of the array antenna by one quarter of a wavelength $\lambda/4$, so that a compensation of a 90° phase displacement is caused again between the input signals of the two antenna subarrays 31 and 32. In the embodiment illustrated in FIG. 6, the special case exists that the antenna subarrays 31, 32 are situated in a common plane, which is possible because of the diagonal radiation of the array antenna 30, while a displacement of the two antenna subarrays 31, 32, with respect to the (diagonal) main radiation direction is nevertheless ensured by $\lambda/4$ with respect to one another.

Figure 7:
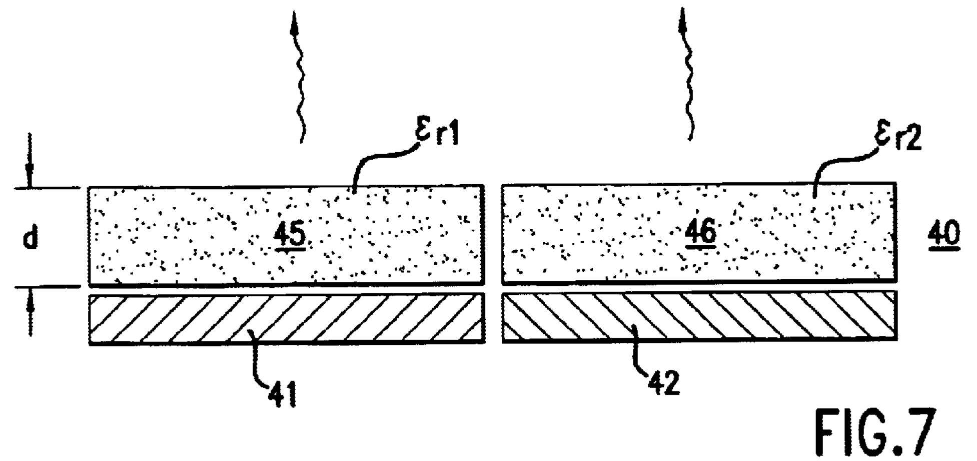
FIG. 7 is a schematic side view of another embodiment of an array antenna system according to the invention.

In the embodiment illustrated as a side view in FIG. 7, antenna subarrays 41, 42 of an array antenna 40 are each covered by means of dielectric layers 45, 46 of different dielectric constants $\epsilon r1$ and $\epsilon r2$ respectively. With respect to details, the dielectric layer 45 provided on the first antenna subarray 41 has a dielectric constant $\epsilon r1$; and the dielectric layer 46 provided on the second antenna subarray 42 has a dielectric constant $\epsilon r2$. The dielectric layers 45, 46 have a thickness d.

In the illustrated embodiment, the thickness d of the two dielectric layers 45, 46 is identical, but this is not absolutely necessary. The thickness d of the dielectric layers 45, 46 is selected such that the path lengths of the radiation emitted by the antenna subarrays 41, 42 are displaced by one quarter of a wavelength λ/4relative to one another, in the sense of a compensation of the phase shifting device (not shown in the figure); compare the phase shifting device 14 in FIG. 4.

If, as assumed in the embodiment illustrated in FIG. 7, $\epsilon r1 > \epsilon r2$, when the radiation of the two antenna subarrays 41, 42 passes through the dielectric layers 45, 46, a phase displacement by λ/4 will occur between the antenna radiation emitted by the two antenna subarrays 41, 42, which compensates the 90° phase displacement of the above-mentioned phase shifting device. In order to obtain the same, if possible, negligibly small reflection factor of the dielectric layers 45, 46 for the two antenna subarrays 41, 42 in practice, for example, the second dielectric layer 46 may be air, and the first dielectric layer 45 is a layered medium (with λ/4 matching layers) with a dielectric constant ϵr1, which is larger than the dielectric constant ϵr2 of air.

In the embodiment illustrated in FIG. 7, the two antenna subarrays 41, 42 are arranged in a common plane; however, this needs not necessarily be so. In the case of a displacement of the two antenna subarrays 41, 42 of the array antenna 40 with respect to the main beaming direction of the antenna, however, such displacement would naturally have to be taken into account when dimensioning the thickness d of the dielectric layers 45, 46.

Figure 8:
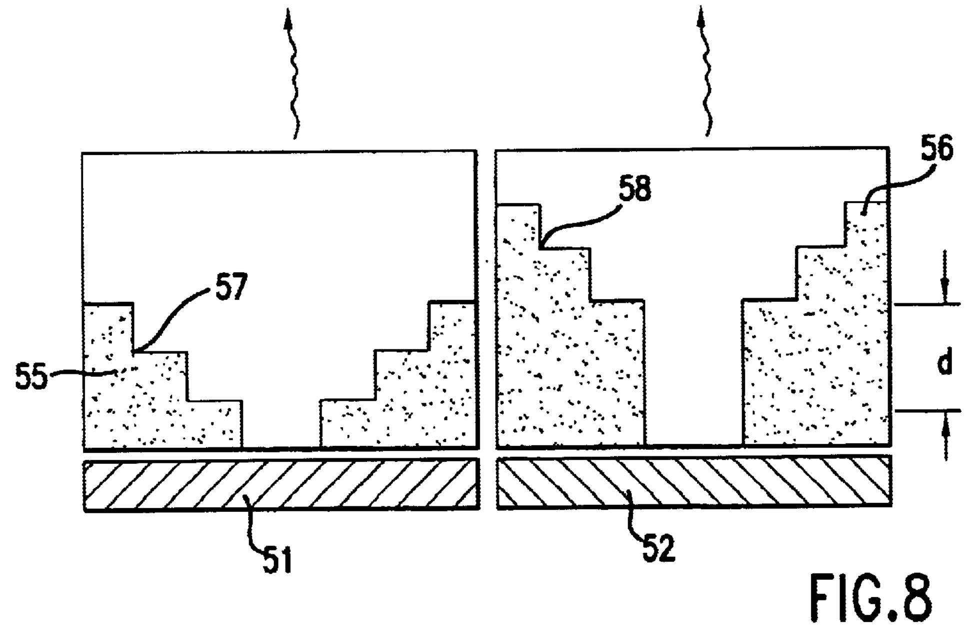
FIG. 8 is a schematic side view of another embodiment of an array antenna system according to the invention.

In the embodiment illustrated in FIG. 8, an array antenna 50 is formed by a first antenna subarray 51 and a second antenna subarray 52. On the antenna subarrays 51, 52, waveguide paths 55, 56 with different cross-sectional dimensions are arranged which causes a phase displacement of the radiation emitted by the antenna subarrays 51, 52 relative to one another. As illustrated in FIG. 8, the waveguide paths 55, 56 have a length which differs by a difference d, so that a displacement of the radiation emitted by the antenna subarrays 51, 52 occurs by a quarter of a wavelength λ/4 relative to one another in the sense of a compensation of the 90° phase displacement.

In the embodiment illustrated in FIG. 8, the antenna subarrays 51, 52 are again arranged in a common plane. Here also, this needs not necessarily be so, but a displacement of the two antenna subarrays 51, 52 relative to one another with respect to the main beaming direction of the array antenna 50 would then have to be taken into account when dimensioning the difference d of the two waveguide paths 55, 56.

At the output of the waveguide paths 55, 56, respective transition paths 57, 58 may be provided with a transition from a narrow cross-section to a wide cross-section, which in the embodiment illustrated in FIG. 8, is implemented by a transition with matching stages.

Figure 9:
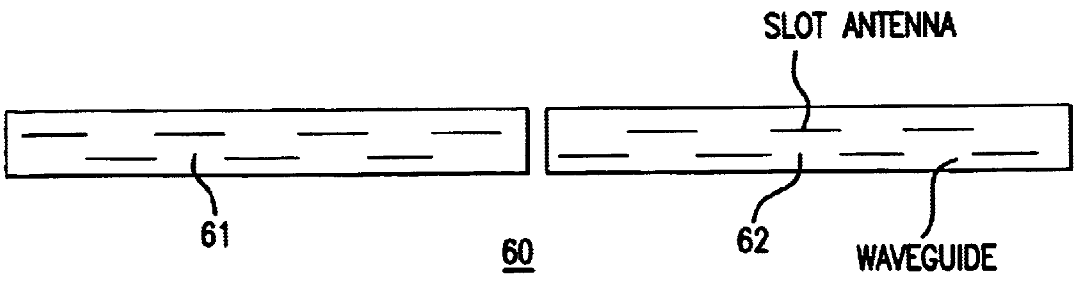
FIG. 9 is a schematic view of another embodiment of an array antenna system according to the invention.

For the array antenna system according to the invention, it is important that the reflection factors of the antenna subarrays are identical. This means that the antenna subarrays must be uncoupled from one another as much as possible. This is ensured when the antenna subarrays are electrically large at least in the direction of the division. No limitation exists in the other direction; that is, also antennas which are small in the direction perpendicular to the division, for example, antenna arrays with only one line, can be used. Such an embodiment is illustrated in FIG. 9, where an array antenna 60 is formed by antenna subarrays 61, 61 which are small in the direction perpendicular to the division, specifically are formed by only two rows of slot radiators.

The effect with respect to the waves reflected on the antenna subarrays achieved by construction of the array antenna system according to the invention is that the reflected waves arrive at the combination transmission line network in opposition and can emerge or be absorbed at the fourth port of the 4-port power splitters used here. As a result, in the case of ideal structural elements, the resulting reflection factor at the antenna input may virtually completely disappear, irrespective of the amount and of the frequency dependence of the reflection factor of the antenna subarrays. The function is limited by non-ideal characteristics of the combination transmission line network and of the phase shifting device. However, the resulting matching bandwidth may nevertheless in many practical cases become significantly larger than that of the antenna subarrays as such.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An array antenna system having an electrically large array antenna, comprising:

a first antenna subarray;

a second antenna subarray;

a combination line network having an input for receiving an antenna power signal, and a first output connected to emit a first output signal to the first antenna subarray, and a second output connected to emit a second output signal to the second antenna subarray;

a phase shifting device for generating a phase displacement between the first and second output signals before they are fed to the antenna subarrays;

apparatus for compensating the chase displacement in the beam path of the antenna radiation emitted by the first and second antenna subarrays; and wherein the antenna subarrays are mutually displaced with respect to a main beaming direction of the antenna.

2. The array antenna system according to claim 1, wherein the antenna subarrays are arranged perpendicular to the main beaming direction of the antenna, and are mutually displaced by a quarter of a wavelength.

3. The array antenna system according to claim 1, wherein:

the antenna subarrays are arranged diagonally to the main beaming direction of the antenna; and the centers of the antenna subarrays are mutually displaced by a quarter of the wavelength with respect to the main beaming direction.

4. The array antenna system according to claim 3, wherein the antenna subarrays are arranged in a common plane.

5. An array antenna system having an electrically large array antenna, comprising:

a first antenna subarray;

a second antenna subarray;

a combination line network having an input for receiving an antenna power signal, and a first output connected to emit a first output signal to the first antenna subarray, and a second output connected to emit a second output signal to the second antenna subarray;

a phase shifting device for generating a phase displacement between the first and second output signals before they are fed to the antenna subarrays; and apparatus for compensating the phase displacement in the beam path of the antenna radiation emitted by the first and second antenna subarrays;

wherein the antenna subarrays are covered by dielectric layers of different dielectric constants, which compensate the phase displacement of the radiation emitted by the antenna subarrays; and wherein a first dielectric layer is air, and a second dielectric layer is a layered medium with a dielectric constant that is larger than the dielectric constant of air.

6. An array antenna system having an electrically large array antenna, comprising:

a first antenna subarray;

a second antenna subarray;

a combination line network having an input for receiving an antenna power signal, and a first output connected to emit a first output signal to the first antenna subarray, and a second output connected to emit a second output signal to the second antenna subarray;

a phase shifting device for generating a phase displacement between the first and second output signals before they are fed to the antenna subarrays; and apparatus for compensating the phase displacement in the beam path of the antenna radiation emitted by the first and second antenna subarrays; and wherein waveguide paths with different cross-sectional dimensions are arranged on the antenna subarrays, which cross-sectional dimensions compensate the phase displacement of the radiation emitted by the first and second antenna subarrays.

7. The array antenna system according to claim 6, wherein the waveguides have a difference (d) in length which causes a relative displacement of the radiation emitted by the antenna subarrays by one quarter of a wavelength in the sense of a compensation of the 90° phase displacement generated by the phase shifting device.

8. The array antenna system according to wherein the antenna subarrays are arranged in a common plane.

9. The array antenna system according to claim 6, wherein at outputs of the waveguide paths, transition paths are provided with a transition from a narrow cross-section to a wide cross-section.

10. An array antenna system having an electrically large array antenna, comprising:

a first antenna subarray;

a second antenna subarray;

a combination line network having an input for receiving an antenna power signal, and a first output connected to emit a first output signal to the first antenna subarray, and a second output connected to emit a second output signal to the second antenna subarray;

a phase shifting device for generating a phase displacement between the first and second output signals before they are fed to the antenna subarrays; and apparatus for compensating the phase displacement in the beam path of the antenna radiation emitted by the first and second antenna subarrays; and wherein the combination line network contains a 4-gate power splitter.

11. The array antenna system according to claim 10, wherein the 4-gate power splitter comprise one of a Wilkinson splitter, a 3-dB directional coupler and an E-H waveguide double-T branching.

12. A method of operating an array antenna system having an electrically large array antenna that includes first and second antenna subarrays and a combination line network that has first and second outputs connected to emit signals to the first and second antenna subarrays respectively, said method comprising:

introducing a phase shift into the signal emitted from said combination line network to one of said first and second antenna subarrays, creating a phase displacement between the signals input to the first and second antenna sub arrays;

compensating the phase displacement by modifying relative physical characteristics of said first and second antenna subarrays.

13. The method according to claim 12, wherein said phase displacement is approximately 90°.

14. The method according to claim 13, wherein said compensating step comprises providing a mutual displacement of the first and second antenna subarrays relative to a beaming direction of the antenna.

15. The array antenna system according to claim 14, wherein the antenna subarrays are arranged perpendicular to the main beaming direction of the antenna, and are mutually displaced by a quarter of a wavelength.

16. The array antenna system according to claim 14, wherein:

the antenna subarrays are arranged diagonally to the main beaming direction of the antenna; and the centers of the antenna subarrays are mutually displaced by a quarter of the wavelength with respect to the main beaming direction.

17. The method according to claim 13, wherein said compensating step comprises covering said first and second antenna subarrays with dielectric layers having different dielectric constants.

18. The array antenna system according to claim 17, wherein the dielectric layers have a layer thickness (d) that causes a displacement between the radiation emitted by the antenna subarrays by a quarter of a wavelength in the sense of a compensation of the 90° phase displacement generated by the phase shifting device.

* * * * *